Patented Feb. 21, 1939

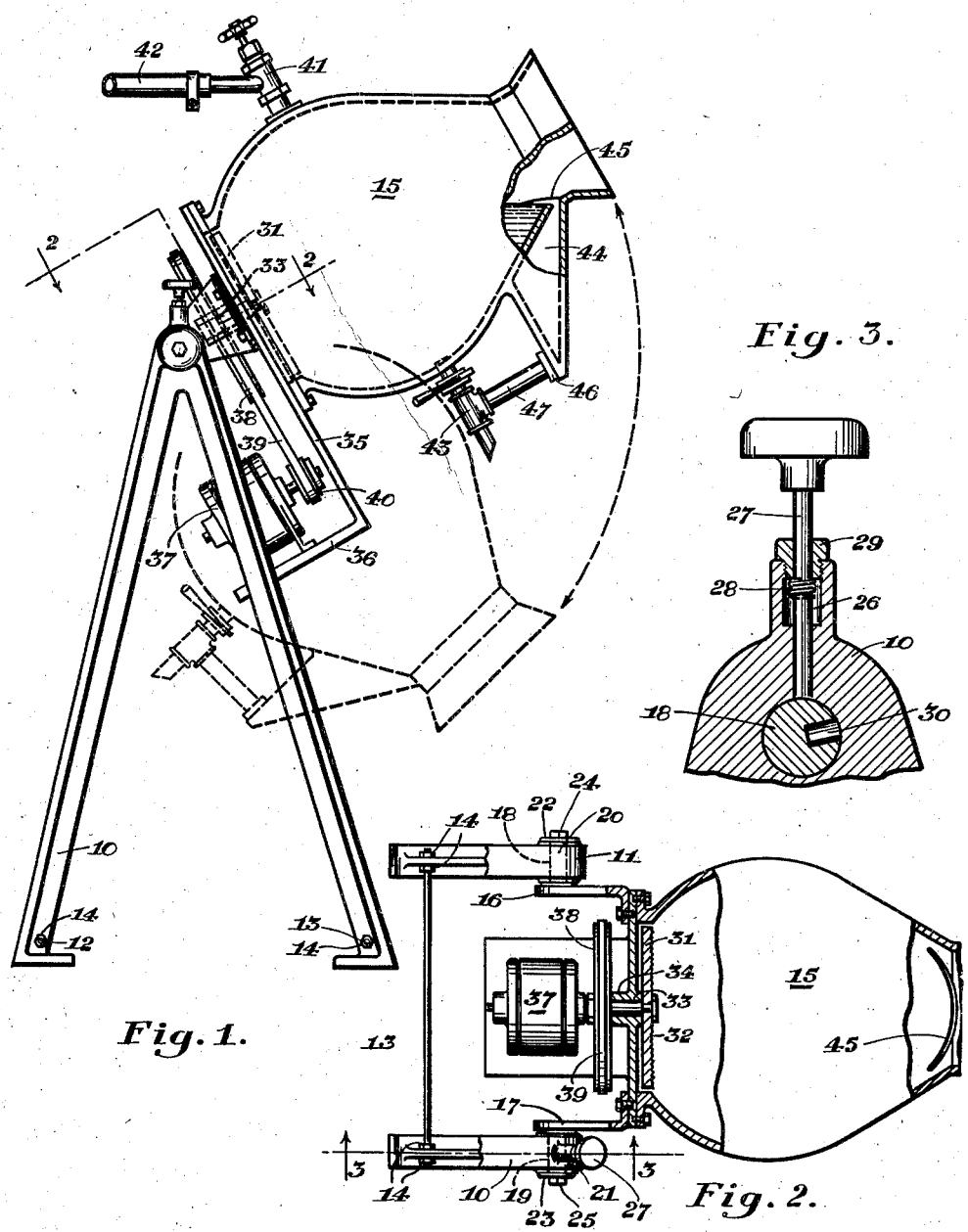

2,148,251

UNITED STATES PATENT OFFICE 2,148,251

VEGETABLE PEELING MACHINE

James J. Wortelboer, Muskegon Heights, Mich.

Application March 8, 1937, Serial No. 129,536

6 Claims. (Cl. 146—49)

The instant invention relates to vegetable peeling machines and more particularly to a machine especially adapted for peeling potatoes, carrots, turnips and the like. The instant application is a continuation in part of applicant's co-pending application, Serial No. 70,296, filed March 23, 1936.

The primary objects of the present invention are to provide a machine of the character above indicated which is especially adapted for use in hotels, restaurants and the like although it will be understood of course that smaller machines are equally well adapted for domestic or home use; to provide such a machine in which water for carrying off the peeling waste may be admitted to and drained from the machine during the peeling operation; to provide such a machine having a hopper which may be manually up-ended or tilted for dumping the vegetables after the peeling operation has been completed; to provide such a machine having a rotatable peeling disc normally disposed at an angle between the vertical and the horizontal whereby an efficient peeling operation is effected; and, to provide such a machine which is economical in manufacture, efficient in operation and utilitarian in use.

An illustrative embodiment of the invention is shown in the accompanying drawing, wherein:

Figure 1 is a side elevational view of the machine, the hopper thereof being shown in its normal operating position in full lines and in its up-ended position in dotted lines;

Figure 2 is a sectional view thereof on line 2—2 of Figure 1; and

Figure 3 is an enlarged sectional view of certain parts thereof taken on line 3—3 of Figure 2, the hopper being swung from its position shown in full lines in Figure 1 to its position shown in dotted lines in the same view.

Referring to the drawing in which like parts of the machine there shown are designated by the same numerals in the several views, a frame support comprises a pair of vertically disposed triangularly formed members 10, 11, here shown as castings, secured together in spaced vertical relation by means of threaded rods 12, 13 having securing nuts 14.

A hopper 15 is here shown as urn shaped and is provided with bifurcated feet 16, 17 having stub shafts 18, 19 respectively integral therewith mounted in bearings 20, 21 at the upper ends of each frame member 10, 11. Apertured plates 22, 23 are secured in the outer ends of the respective stub shafts 18, 19 by means of bolts 24, 25 threaded into these shafts. The upper end of the frame member 10 is provided with a bore 26 within which a plunger 27 is slidably disposed and an expansion spring 28 connected to and encircling this plunger is also disposed within the bore and bears against a bushing 29 in the top thereof. This spring normally urges the plunger downwardly against stub shaft 18, which is provided with a well 30 adapted to receive the lower end of the plunger when the hopper is in the operative position shown in full lines in Figure 1, thereby maintaining the hopper in this position until the plunger is manually retracted out of engagement with the shaft 18, whereupon the hopper swings by its own weight to the position shown in dotted lines in Figure 1.

A rotatable disc 31 having a toothed, abraded or other roughened surface 32 is disposed within the hopper 15 in parallelism with the floor thereof and this disc is fixedly secured to a shaft 33 rotatably journalled in the journal bearing 34 as best shown in Figure 2.

A bracket 35 having a flanged portion 36 is secured to the base of the hopper exteriorly thereof in any suitable manner and power means, here shown as an electric motor 37 within an electric circuit (not shown), is mounted on the flanged portion 36 of the bracket 35. The shaft 33 of the rotating disc 31 has a pulley wheel 38 fixedly secured at its outer end and a belt 39 carried by this pulley wheel and by the pulley wheel 40 of the motor provides means for effecting rotation of the peeling disc 31.

The hopper 15 is provided with a valved inlet spigot 41 connected with a flexible conduit 42 for supplying water to the hopper and with a valved outlet spigot 43 for draining water therefrom. The hopper is likewise preferably provided with an overflow well 44 connected to the hopper's main compartment by an arcuate port 45 which is substantially horizontal when the hopper is in the operating position shown in full lines in Figure 1, so that waste water may spill through the entire port, which is also of sufficient area to permit vegetable peelings to pass therethrough and the overflow well's outlet end 46 is connected with a conduit 47 whose other end is connected with the outlet spigot 43.

Operation

In operation, vegetables to be peeled, such as potatoes, carrots, turnips and the like, are placed in the hopper, water is admitted to the hopper through the inlet spigot and the electric motor circuit is closed. As the peeling disc is thus caused to be rotated, potatoes or other vegetables within the hopper are caused to be milled about and against the peeling disc. Due to the angular inclination of the peeling disc, the vegetables are drawn by the force of gravity acting upon them during the milling of the vegetables obliquely across the face of the disc, thus peeling a greater area of each vegetable, as it contacts the disc, than if the disc were horizontally disposed. Peeling, dirt and froth rising to the top of the water within the hopper are carried into the overflow well and discharged through the outlet conduit connected with the outlet spigot.

When the peeling operation is completed, the hopper may be manually up-ended or tilted from its position shown in full lines in Figure 1 to its position shown in dotted lines in the same view and the peeled vegetables thus dumped therefrom.

It will thus be seen that the machine herein shown and described is adaptable both for commercial and domestic use and that the machine is efficient in operation, utilitarian in use and economical in manufacture. Although the machine is here shown as power operated it will be understood of course that the peeling disc may be manually operated as by a crank.

While but one specific embodiment of this invention has been herein shown and described, it will be understood that certain details of the construction shown may be altered or omitted without departing from the spirit of this invention as the same is defined by the following claims.

I claim:

1. In a structure of the class described, a support having a pair of horizontally spaced aligned bearings, a hopper provided with a pair of stub shafts disposed within said bearings, a plunger mounted in said support slidably to positions of disengagement from one of said stub shafts or of engagement therewith in which latter position of engagement the hopper is maintained with the floor thereof inclined at an angle, a rotatable disc having a roughened surface disposed within the hopper in parallelism with the floor thereof, and power means operatively connected with the disc for effecting rotation thereof.

2. In a structure of the class described, a support having a pair of horizontally spaced aligned bearings, a hopper provided with a pair of stub shafts disposed within said bearings, a plunger mounted in said support slidably to positions of disengagement from one of said stub shafts or of engagement therewith in which latter position of engagement the hopper is maintained with the floor thereof inclined at an angle, a rotatable disc having a roughened surface disposed within the hopper in parallelism with the floor thereof, power means operatively connected with the disc for effecting rotation thereof, an inlet conduit for supplying water to the hopper, and an outlet conduit for draining water from the hopper.

3. In a structure of the class described, a support having a pair of horizontally spaced aligned bearings, a hopper provided with a pair of stub shafts disposed within said bearings, a plunger mounted in said support slidably to positions of disengagement from one of said stub shafts or of engagement therewith in which latter position of engagement the hopper is maintained with the floor thereof inclined at an angle, a rotatable disc having a roughened surface disposed within the hopper in parallelism with the floor thereof, power means operatively connected with the disc for effecting rotation thereof, an inlet conduit for supplying water to the hopper, an outlet conduit for draining water from the hopper, and an overflow conduit from the hopper connected with the outlet conduit.

4. In a structure of the class described, a support having a pair of horizontally spaced aligned bearings, a hopper provided with a pair of stub shafts disposed within said bearings, one of said stub shafts having a radially extending well therein, a plunger mounted in said support slidably out of or into said well, in the latter of which positions the hopper is maintained with the floor thereof inclined at an angle, a rotatable disc having a roughened surface disposed within the hopper in parallelism with the floor thereof, and power means operatively connected with the disc for effecting rotation thereof.

5. In a structure of the class described, a support having a pair of horizontally spaced aligned bearings, a hopper provided with a pair of stub shafts disposed within said bearings, means associated with said support and one of said stub shafts for releasably maintaining said hopper in a position with its longitudinal axis inclined, said hopper having a main compartment, an overflow well, and an arcuate port in the wall of the upper portion of said hopper connecting said main compartment and said overflow well, the arcuate slot being disposed substantially horizontally when the hopper is maintained in said inclined position.

6. In a structure of the class described, a support having a pair of horizontally spaced aligned bearings, a hopper provided with a pair of stub shafts disposed within said bearings, said hopper having a main compartment, an overflow well, and an arcuate port connecting said main compartment and said overflow well, a plunger mounted in said support slidably to positions of disengagement from one of said stub shafts or of engagement therewith in which latter position of engagement the hopper is maintained at such an angle that its floor is inclined and its arcuate port is disposed substantially horizontally, a rotatable disc having a roughened surface disposed within the hopper in parallelism with the floor thereof, and power means operatively connected with the disc for effecting rotation thereof.

JAMES J. WORTELBOER.